United States Patent [19]

Wallstén et al.

[11] Patent Number: 4,948,485
[45] Date of Patent: Aug. 14, 1990

[54] CASCADE ARC PLASMA TORCH AND A PROCESS FOR PLASMA POLYMERIZATION

[75] Inventors: Hans I. Wallstén, Denens, Switzerland; Hirotsugu K. Yasuda, Columbia, Mo.

[73] Assignee: Plasmacarb Inc., Wilmington, Del.

[21] Appl. No.: 274,775

[22] Filed: Nov. 23, 1988

[51] Int. Cl.$^5$ .................. C23C 14/12; C23C 14/28; H05H 1/34; H05H 1/42
[52] U.S. Cl. .................. 204/164; 204/165; 204/168; 204/169; 427/34; 427/41; 427/423; 219/121.48; 219/121.5; 219/121.51; 219/121.52; 219/121.59
[58] Field of Search ............ 204/164, 165, 168, 169; 219/121.47, 121.48, 121.5, 121.51, 121.52, 121.59; 427/34, 41, 423

[56] References Cited

U.S. PATENT DOCUMENTS

| | | | |
|---|---|---|---|
| 3,010,009 | 11/1961 | Ducati | 427/34 |
| 4,596,718 | 6/1986 | Gruner | 427/34 |
| 4,670,290 | 6/1987 | Itoh et al. | 427/423 |

FOREIGN PATENT DOCUMENTS 1092029 5/1984 U.S.S.R. .

OTHER PUBLICATIONS

Calcote, *Plasma Deposition of Amorphous Silicon*, NASA Tech. Briefs, Spring 1981, p. 42.

Primary Examiner—John F. Niebling
Assistant Examiner—David G. Ryser
Attorney, Agent, or Firm—Burns, Doane, Swecker & Mathis

[57] ABSTRACT

The present invention is directed to an arrangement of cascade arc plasma torches in a process for plasma polymerization. The arrangement is utilized in low temperature plasma polymerization coating and utilizes a plasma reactor with concentric electroconductive rings separated by insulator rings. The rings are positioned between electrode connectors and form a central passage through the plasma reactor. A voltage supply source provides a voltage across the plasma reactor so as to initiate and continue the polymerization coating process. Downstream of the plasma reactor, an arrangement is provided by which monomeric gas is fed into a passage at a downstream end of the reactor so as to enable plasma polymerization.

21 Claims, 4 Drawing Sheets

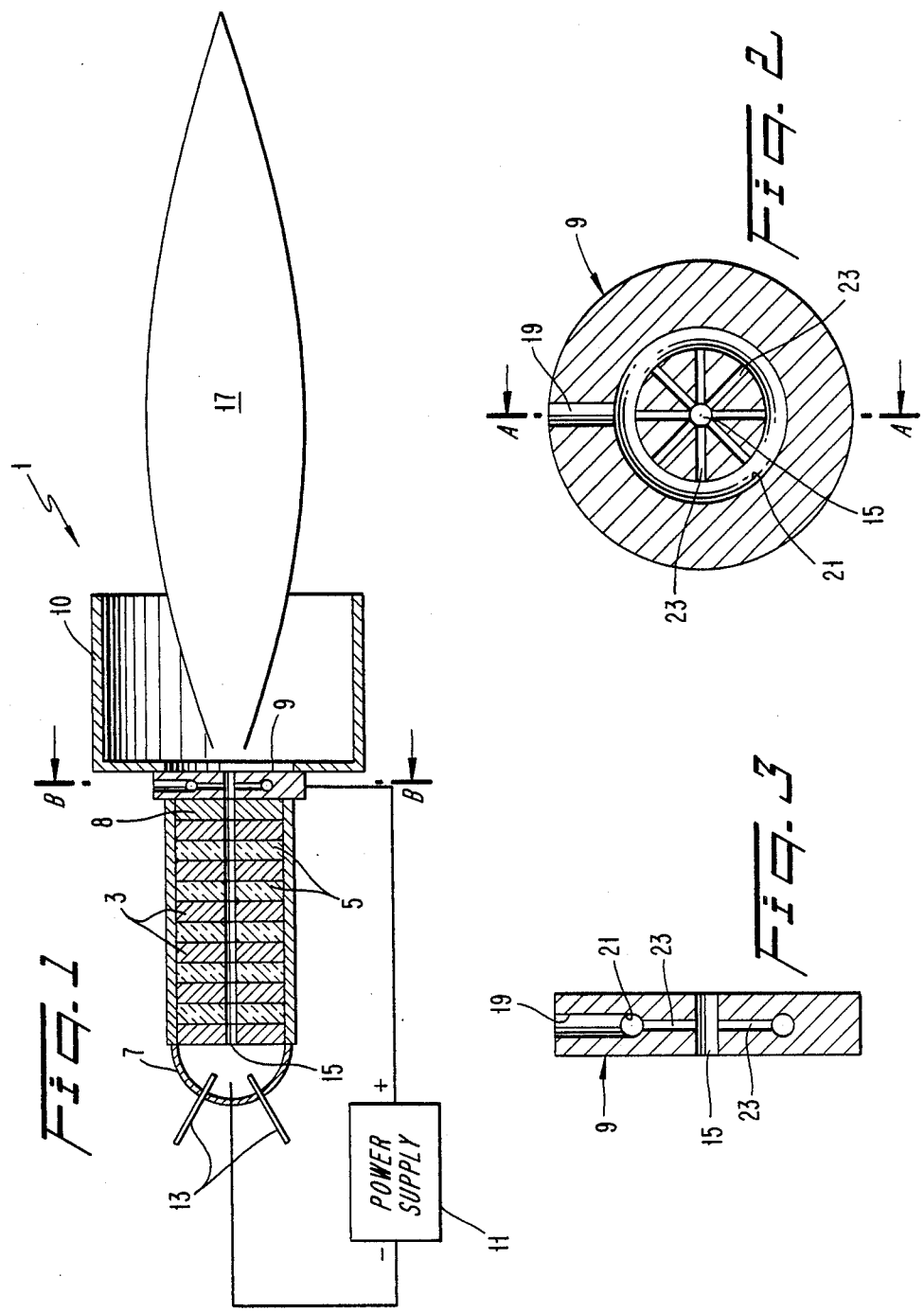

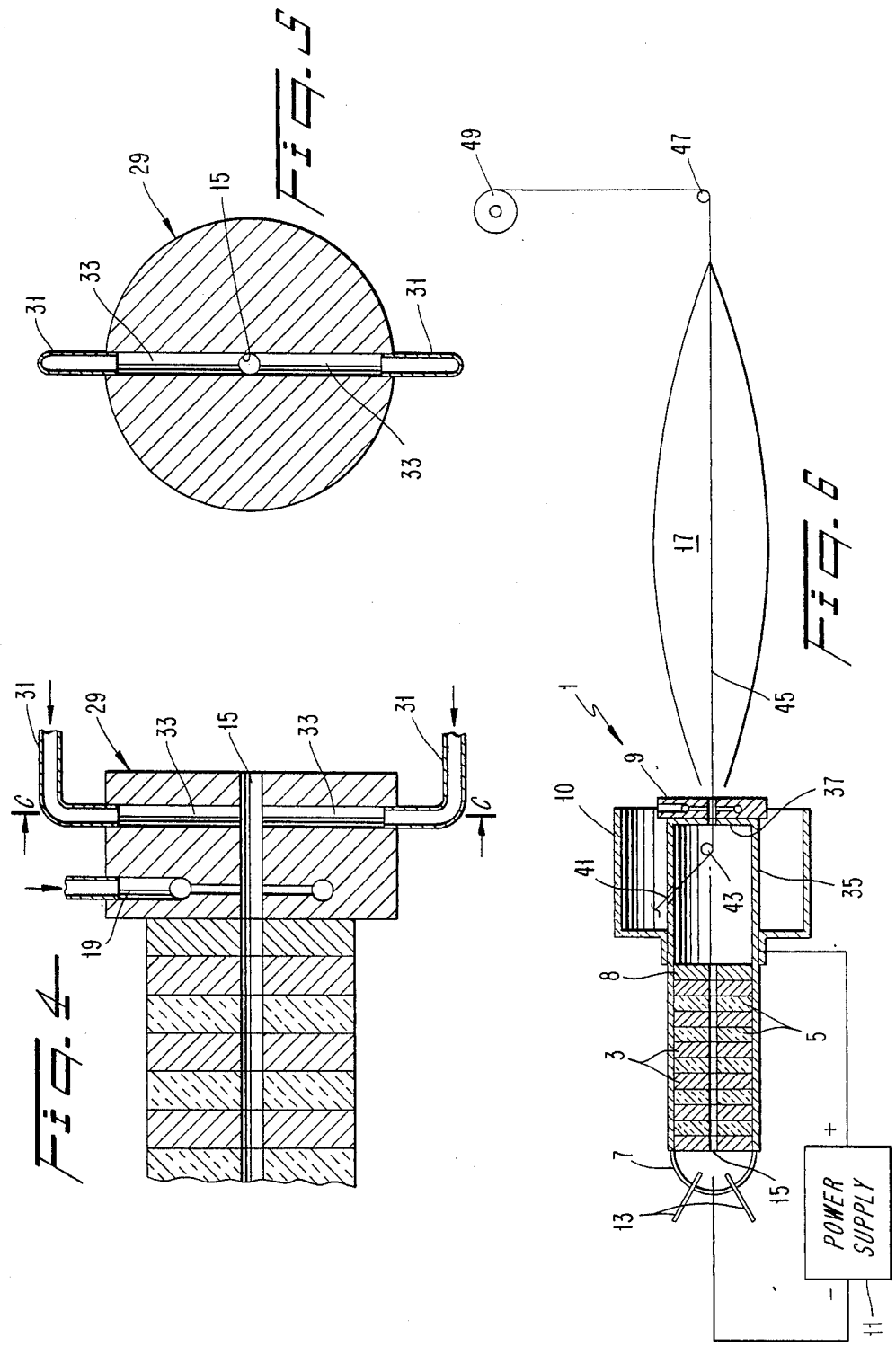

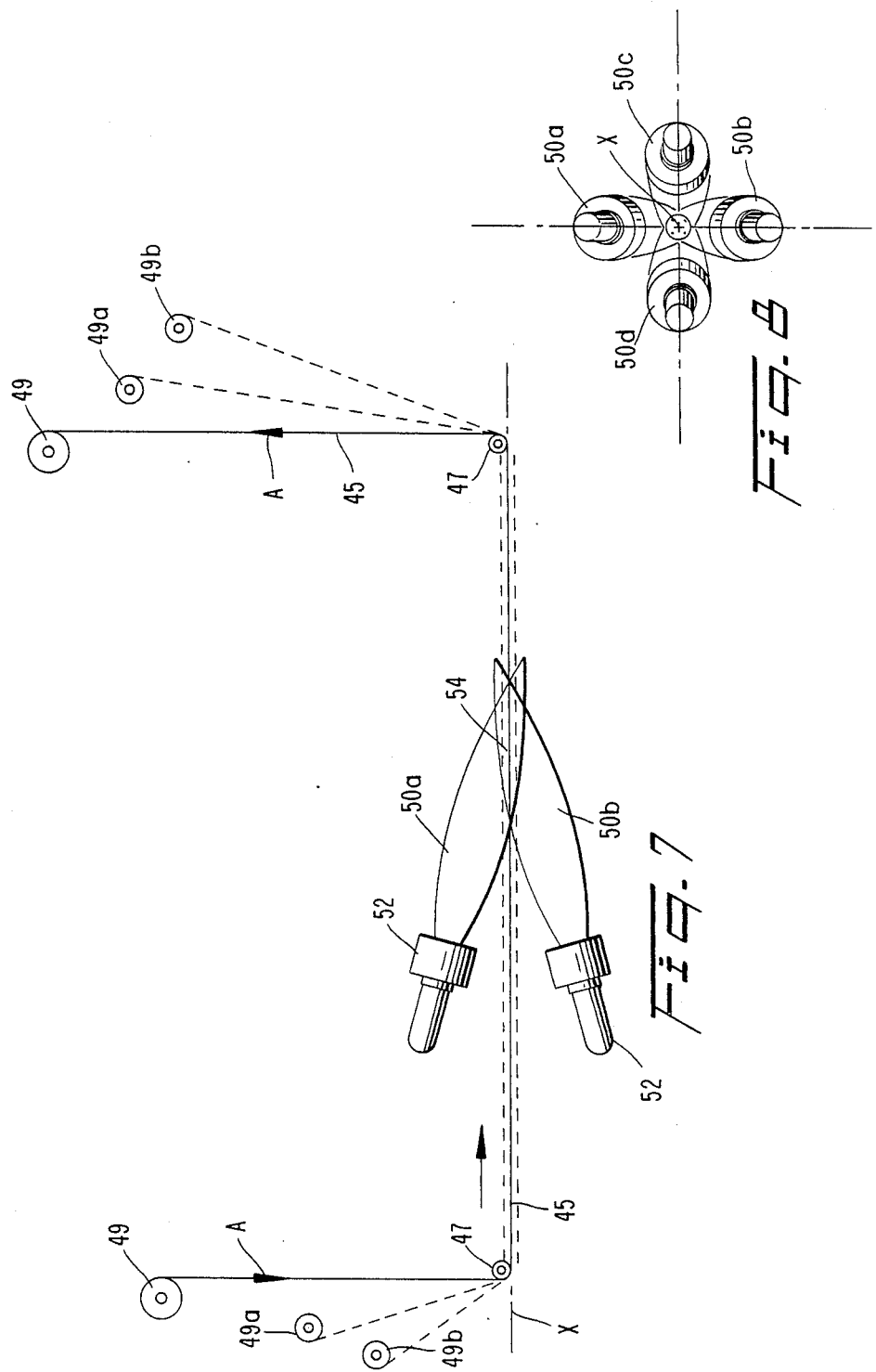

CASCADE ARC PLASMA TORCH AND A PROCESS FOR PLASMA POLYMERIZATION

BACKGROUND AND SUMMARY OF THE INVENTION

The present invention relates to a cascade arc plasma torch for use in low temperature plasma polymerization coating. The invention also extends to a process for plasma polymerization at low pressure and at low temperature.

Plasma polymerization is a technique which emanates from the early 1960's. In the early stage of development of this technique it was a widely held impression that plasma polymerization was a highly exotic method used to form an ultra-thin layer of a polymer. The method was of interest mainly as a curiosity in the methodology of polymerization, since the resulting plasma polymer was believed to be identical to a conventional polymer derived from the same monomer. During the more than two and a half decades that have elapsed since the earliest development took place it has become apparent that polymers produced by this technique have characteristic properties differing from those of polymers produced by more conventional means. Today it is more appropriate to describe plasma polymerization as a unique method which can be used to prepare special materials.

Today plasma polymerization is a technique which has left the stage of laboratory curiosity. Although it is difficult to estimate the extent to which highly proprietary industrial operations are presently involved in plasma polymerization activities, it is known that some large scale industrial applications of plasma vacuum deposition polymerization are currently used. As examples there may be mentioned that the head light reflectors used in most European cars are manufactured by Bosch using a large scale vacuum deposition process. In this practical application the vacuum deposition of metal for the reflecting surface and the deposition of plasma polymer onto the metal surface to protect it from corrosion and tarnishing are combined into one continuous process. 3M Company produce optical storage discs by vacuum deposition of various components including methyl methacrylate. The indicated industrial processes use plasma polymerization to an extent which verifies that it has achieved an importance far beyond that of a mere laboratory curiosity.

However, the techniques presently used for deposition by a plasma polymerization are associated with severe drawbacks among which the following may be mentioned.

In conventional plasma polymerization the total substrate surface area that can be coated evenly is limited by the total volume of plasma because the substrate surface must be immersed in the plasma volume.

The yield of deposited polymer in relation to the monomer used is very low in conventional plasma polymerization due to the fact that the plasma volume accommodating the substrate contains such monomer throughout its whole volume.

Excessive fragmentation of monomer molecules takes place due to ionization resulting in even more impaired yield of deposited polymer.

The present invention has for a main object to provide new techniques based on the use of a cascade arc plasma torch operated at low temperature for plasma polymerization coating while eliminating or at least greatly reducing the drawbacks associated with the prior art plasma polymerization techniques.

Another object of the invention is to provide a cascade arc plasma torch for use in low temperature plasma polymerization.

Yet another object of the invention is to provide a process for plasma polymerization at low pressure and at low temperature using a cascade arc generator.

The present invention is based on an entirely new concept whereby a monomer or a mixture of monomers will be injected into a plasma torch or plasma jet and not into a vacuum chamber as in the conventional art. Due to the high velocity of gas in the low temperature plasma torch generated in a cascade arc generator the back diffusion of monomer molecules to the energy input zone where ionization occurs is practically nil. This means that the monomer introduced into the cascade arc torch will not be subjected to the ionization process, which by some investigators is believed to be an essential step for plasma polymerization. Although the invention is not to be construed to be limited to any specific mechanism or operational principle it has been found quite surprisingly that plasma polymerization takes place without the ionization of monomers which up to now has been believed to be necessary.

Accordingly, the present invention provides for a cascade arc plasma torch apparatus for use in low temperature plasma polymerization coating, said apparatus comprising means for vacuum generation, a plasma reactor including concentric electroconductive rings separated by insulator rings, said rings being arranged between electrode connectors and forming a central passage through said plasma reactor, a voltage supply source providing a voltage across said plasma reactor, and supply means for introducing an inert gas into said passage. Such apparatus is characterized by first inlet means positioned at the downstream end of the plasma reactor for feeding monomeric gas enabling plasma polymerization into said passage at the downstream end thereof.

Such first inlet means for the supply of monomeric gas is preferably constituted by inlet parts or nozzles distributed around the periphery of the central passage of the apparatus.

According to another aspect of the invention the apparatus can be provided with powder inlet means positioned adjacent to said first inlet means, preferably downstream thereof, which enable introduction of powder into the generated plasma for plasma polymerization processing of powder. Such powder inlet means can likewise be constituted by inlet parts or nozzles distributed around the periphery of the central passage.

Furthermore, the invention provides a process for plasma polymerization at low pressure and at low temperature, said process comprising the steps:

(a) creating a plasma in a cascade arc generator to form a plasma torch which is directed into a low pressure zone;

(b) injecting a monomeric gas into said plasma torch; and (c) directing the plasma torch resulting from step (b) onto a substrate to form a film thereon by plasma polymerization.

The pressure of the low pressure zone is preferably less than about 100 Torr. The monomeric gas supplied into the plasma zone preferably contains monomers selected from hydrocarbons, halogenated hydrocarbons, silanes and organosilanes optionally together with hydrogen.

According to a special feature of the invention the substrate to be coated by plasma polymerization is a powder, such as a metallurgical powder, which is introduced into the plasma torch downstream of the site of injection of the monomeric gas.

According to yet another aspect of the process of the invention the substrate is an elongated member such as a wire, a tubing, a band or a filament, etc., introduced in the direction of its length into the process before the monomeric gas injection site, whereby the pretreatment of substrate surface and a deposition of polymer could be achieved in a single uniform process. By such pretreatment undesirable contamination on the substrate can be easily removed.

The present invention provides new techniques, whereby a high yield of deposited polymer is obtained and a well defined localized polymer deposition is made possible. In order to obtain uniform coating of a wide area the plasma torch can be arranged to scan the location of deposition in a predetermined pattern. An important aspect in this context is the fact that the invention provides freedom from the limitation based on plasma volume/surface area which is encountered in the conventional plasma polymerization using glow discharge.

Another advantage of the low temperature plasma torch technique described herein is the fact that the coating operation is less disturbed by other external factors, such as magnetic field and the presence of Faraday Cage effect and, consequently, the process of the invention can be applied to the coating of the inner surface of a Faraday Cage, such as the inner surface of an automobile body.

The present invention also enables powder processing by a plasma polymerization. The main object of this aspect of the invention is to alter the surface characteristics of powder by applying an ultra-thin layer of plasma polymer coating. Such applications include sintering powders in general, such as ceramic powders and metal powders for powder metallurgy. Furthermore, the invention is useful for protective coating of metallic pigments, such as aluminum powder used in automotive paints, and coloured pigments and fillers used in paints and plastics. In this context other gases, such as oxygen, for example for anodization of aluminum powder, and methane can be fed through the arc system by mixing with an inert gas, such as argon. More complex monomers could be fed through the monomer inlet located downstream of the central passage of the plasma torch apparatus.

By injecting a monomeric gas into the plasma torch created by the cascade arc at the downstream end of the plasma reactor passage chemical reaction of the monomers with the excited species in the plasma can be utilized to perform polymeric deposition without subjecting the monomer molecules to ionization. This is an advantage since the ionization of organic molecules causes extensive fragmentation of the original molecular structure thus reducing the yield of deposited polymer and also altering its properties.

In most plasma polymerization procedures using glow discharge an energy input of 0.1 to 15 GJ/kg monomer is generally found to be necessary to form plasma polymers. However, this high energy level also causes excessive fragmentation of the original monomer structure. Using the technique of the present invention a low pressure cascade arc can be generated at an energy input of 1 to 10 MJ/kg monomer. This is several orders of magnitude lower in energy input than that used in conventional art. Therefore, the low pressure cascade arc of this invention offers the possibility of forming polymeric films whose chemical structure can be controlled primarily by the selection of monomer structure and only secondarily by energy input level.

In a cascade arc reactor of this invention the monomeric gas injected into the reactor cannot diffuse back into the cascade arc generator because of the high forward flux of the plasma. This results in a surprisingly high deposition rate of polymer despite the relatively small monomer flow rate compared to that of the inert gas, such as argon, entering the reaction chamber. This means that the rate of the chemical reaction in such system is high and that most of the monomer or mixture of monomers injected into the reactor are quickly and efficiently consumed by the flame and deposited on the substrate.

The invention will now be further illustrated by non-limiting embodiments and specific examples. The embodiments will be described in conjunction with the appended drawing, wherein:

BRIEF DESCRIPTION OF THE DRAWINGS

FIG. 1 is a diagrammatic side view of a torch generator in accordance with the present invention;

FIG. 2 is an enlarged section taken along line B—B of FIG. 1;

FIG. 3 is a section taken along line A—A of FIG. 2;

FIG. 4 is a schematic side view of an alternative embodiment of the generator of the invention; and FIG. 5 is a section taken along line C—C of FIG. 4;

FIG. 6 is a modification of the generator shown in FIG. 1 for use in coating a wire or filament;

FIG. 7 is a modification of the generator shown in FIG. 6 in which a plurality of torch generators are used in coating wires or filaments;

FIG. 8 is an end view of the modification of FIG. 7; and

DETAILED DESCRIPTION OF THE PREFERRED EMBODIMENTS

Figure 9:
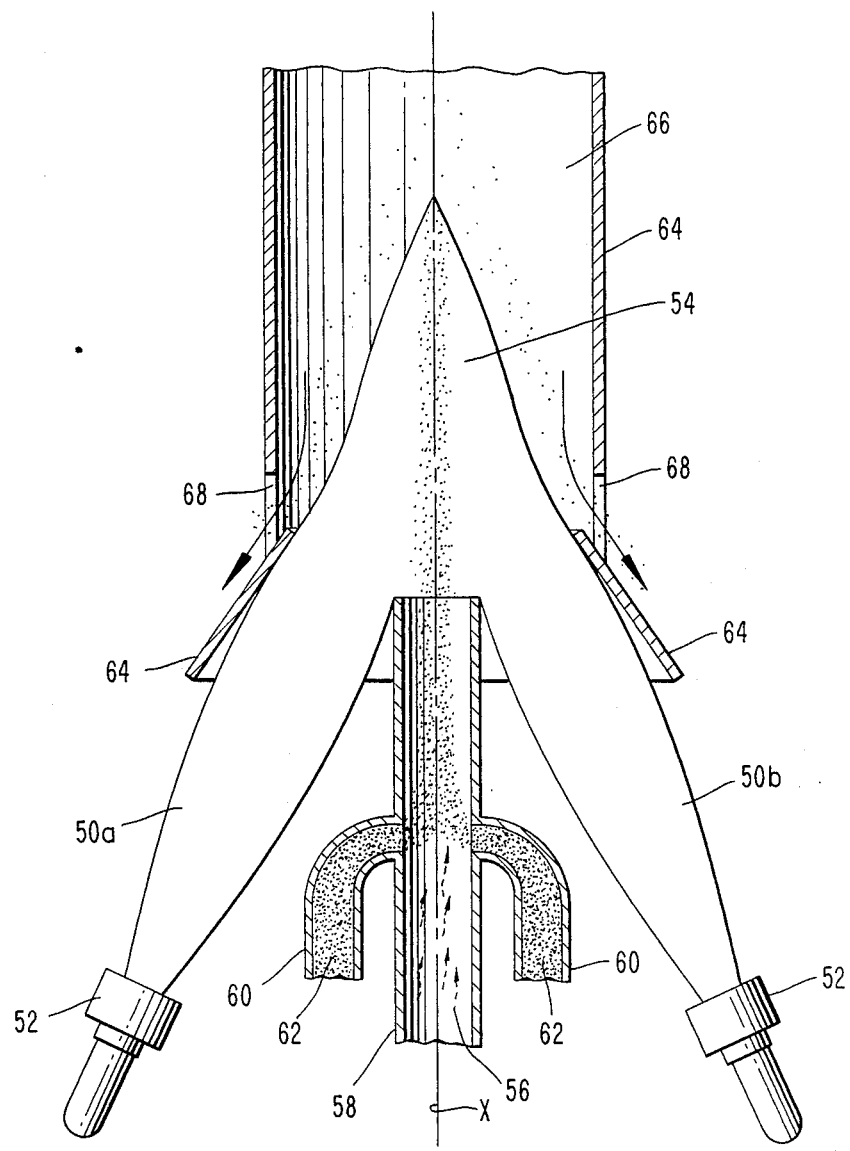
FIG. 9 is a schematic side view of a further embodiment of the invention.

The cascade arc reactor is a kind of a new version of a plasma torch useful in local deposition of plasma polymers. The reactor or generator shown diagrammatically in FIGS. 1 to 3 and generally designated 1 is built up from a series of concentric metallic rings 3 separated by insulator rings 5. The metallic rings 3 float electrically between cathodes 13 which are located in the end cap 7, but insulated from the cap, and an anode ring 8. A circular sleeve 10 is attached to the downstream end of the anode 8 via an insulator ring. A relatively low DC voltage power supply 11 is connected between the cathodes 13 and the anode 8 as shown in FIG. 1. A suitable voltage is about 0.2 to 2 kV. The system of metallic rings 3 and insulator rings 5 forms a central passage 15, and in the downstream extension of said section 15 a plasma torch 17 will be formed under operation. Argon is injected into the system at end cap 7 and provides a high gas flux into the vacuum at the outlet of the reactor. Torch 17 is directed into a vacuum chamber (not shown in the drawing), and the plasma is provided by field emission between multiple cathodes 13 in the end cap and the anode ring 8. The torch operates typically in a vacuum of about 10 Torr.

Injector ring 9 is shown more in detail and by enlarged views in FIGS. 2 and 3. It is provided with inlets 19 for monomeric gas opening into a ring-shaped channel 21 which in turn is connected to radial channels 23 opening into the central passage 15.

The embodiment shown in FIGS. 4 and 5 corresponds largely to that shown in FIGS. 1 to 3 but its injector ring 29 has been modified to include powder inlets 31 for feeding powder for processing into the central passage 15 via radial channels 33. This arrangement for feeding powder into the central passage 15 is situated downstream of the site of introduction of monomeric gas.

The embodiment shown in FIG. 6 corresponds in essential parts to that shown in FIG. 1. However, the torch generator of FIG. 6 has been modified by providing an extension of the system of metallic rings 3 and insulator rings 5 and the anode ring 8 in the form of a sleeve 35 provided with an end wall 37 with a central hole 39. Injector ring 9 of the same construction as shown in FIGS. 2 and 3 is concentrically attached to the outside of end wall 37 for the introduction of a desired monomer into the central passage of the generator.

Sleeve 35 is provided with a slanted inlet aperture 41 in its wall intended for the introduction of a wire or filament 45. The wire or filament 45 is passed around a guide member 43 and continues through the central hole 39 and the injector ring 9 out into torch 17 for coating by plasma polymerization. The coated wire or filament 45 then continues around another guide member 47 and is wound up onto a storage member 49. It is of course possible, in order to save costs and increase capacity to arrange a plurality of inlet apertures for simultaneous treatment of a plurality of elongated members such as wires, tubings, bands, filaments, etc. In such case the inlet apertures are suitably arranged evenly distributed around the sleeve wall.

When passing through the inner space of sleeve 35 wire or filament 45 will be subjected to surface cleaning before passing through injector ring 9 out into torch 17. This pretreatment of the wire or filament 45 is useful for obtaining good adhesion of the coating to be deposited onto same.

The embodiment shown in FIGS. 7 and 8 is similar to that of FIG. 6; however a plurality of cascade arc plasma torches are shown at reference numerals 50a, 50b, 50c and 50d (FIG. 8). In this embodiment, the plasma arc torches are arrayed substantially circularly around a principal axis X. Due to an inclined mounting arrangement of the torch generators 52, the axis of each plasma torch 50a, 50b, 50c and 50d will converge to a focal point on the principal axis X.

Accordingly, each of the torches will provide an extended zone of flames 54 through which the elongated members, such as wires, tubings, bands, monofilaments, etc., 45 can be passed. The embodiment of FIGS. 7 and 8 permits the elongated members to be treated, to have a straight path, along the principal axis X, through the zone 54 provided by the plurality of torches. Further, this embodiment permits a large number of wires or monofilaments, etc., to be simultaneously treated. FIG. 7 shows such an arrangement in which storage spools 49 unwind and wind, for example, a wire or monofilament 45 as it passes over guide members 47 in proceeding from an uncoated state upstream of the torches to a coated state downstream of the zone 54 in the direction of the arrows. This type of multi-torch arrangement permits the coating of a plurality of wires or monofilaments 45, as schematically shown by storage spools 49a and 49b. While the invention has been described in terms of coating wires or monofilaments, it is also suitable for multifilament yarns and other elongated members having a variety of configurations.

The arrangement of FIG. 9 shows a device for the treatment of powders in which the powder is preferably fed vertically upwardly by an injector system of the type shown in FIG. 7. Therein, the torch generators 52 are of the same type as that shown in FIG. 7. Accordingly, two cascade arc plasma torches are shown at 50a and 50b. A gas 56 is introduced in the direction of the principle axis X. The gas is introduced into a tube 58. Downstream from the introduction of the gas into tube 58, conduits 60 are provided for the introduction of powders 62 into the tube 58. By the introduction of the powder 62 in this manner, the powder is blown, as shown in FIG. 9, in a vertically upward direction, by the gas 56.

The powders are treated in the zone 54 which extends partially into a housing 64 defining a chamber 66 therein. The chamber 64 is provided with openings 68 so as to permit the treated powders 62 to fall downwardly from the zone 54 and into a suitable chamber (not shown) for collection.

It is apparent from the foregoing description that other modifications of the embodiments are possible. For example, the embodiment described in conjunction with FIG. 7 could be utilized in which a single torch is used and is positioned to be obliquely arranged relative to the path of the filament to be treated. An additional arrangement which is contemplated is a two-staged treatment process by which the embodiment of FIG. 6 is utilized for the treatment of a filament by the use of a single cascade arc plasma torch. Subsequently, a plurality of cascade arc plasma torches as contemplated by the arrangement of FIG. 7 could be arranged downstream of the single torch. This arrangement would permit a second stage of treatment in which several torches are arrayed substantially circularly around a principle axis X and downstream of a single torch.

It is also contemplated that a plurality of torches could be circularly arrayed as shown in FIG. 7 and 8 and the powder to be treated could be fed by a screw injector or other such arrangement downstream of the arrayed torches. Such an arrangement would also be utilized in conjunction with a single torch as in the embodiment of FIG. 6.

The invention will now be described by specific examples, wherein the embodiments of the apparatus of this invention shown in the drawings are used.

EXAMPLE 1

A cascade arc reactor of the type shown in FIG. 1 of the drawings and containing a cascade arc system has a 2 mm diameter pathway and a monomer inlet system located at the downstream side of the anode. The vacuum chamber is evacuated to a system pressure of less than 1 mtorr, and argon is then introduced at the end cap 7 on the cathode side of the reactor at a flow rate of approximately 2000 sccm/min. An arc is generated by applying a voltage of 700 volt, and tetrafluoroethylene is introduced into the monomer inlet at a flow rate of approximately 12 sccm/min. A cold drawn steel sheet, 3 cm × 3 cm, is placed at the tip of the flame-shaped arc discharge. Plasma polymer of tetrafluoroethylene is deposited on the substrate at a rate of approximately 100 nm/min. The atomic ratio of fluorine to carbon is approximately 1.8.

EXAMPLE 2

The same reactor as described in Example 1 and the same conditions are used except for the monomer, which in the instant example is methane and approximately 6 sccm/min. of methane is introduced into the cathode cap. Plasma polymer of methane is deposited on the substrate at a rate of approximately 400 nm/min. The atomic ratio hydrogen to carbon is at most about 1.0.

EXAMPLE 3

A powder feeding system as described in FIGS. 4 and 5 is provided on the cascade arc reactor as described previously having a 4 mm diameter pathway at the downstream side of the monomer inlet. Argon is added at a flow rate of approximately 600 sccm/min., and methane is added at a rate of approximately 6 sccm/min. from a monomer inlet located immediately after the anode ring 8. A plasma polymer forming arc is created by applying 600 volt, and steel powder for use in powder metallurgy is fed into the arc plasma via the powder inlet by a gear pump at a rate of approximately 2 ccm/min. Plasma polymer coated powder is collected in a trap located within the vacuum chamber.

Plasma polymer coated powder and uncoated powder behave differently in regard to flow, in that untreated powder has a flow of approximately 30 secs. per 50 g, whereas plasma polymer coated powder has a flow of approximately 26 secs. per 50 g. Apparent density and compressibility are substantially unchanged.

EXAMPLE 4

An extension tube made of machinable ceramic with an inner diameter approximately the same as the pathway of the cascade arc reactor, i.e., 4 mm, and a length of 50 mm is arranged on the cascade arc reactor as depicted in FIG. 6. This extension tube is provided with a slanted small hole having a diameter of approximately 1 mm, through which a wire or filament is passed into the centerpart of the tube. At the downstream end of the extension tube monomer inlet ring of the type described in FIGS. 2 and 3 is arranged. Plasma polymerization coating of a Nylon 66 filament is carried out using the same conditions as described in Example 1, the filament being fed through the extension tube and through the flame 17. The filament is a monofilament having a diameter of 0.3 mm, and the plasma polymer coated filament shows highly hydrophobic surface characteristics similar to those of Teflon.

EXAMPLE 5

The same apparatus as described in Example 4 is used in this example, wherein a guide wire of spring steel having a diameter of 0.5 mm is plasma polymer coated. While maintaining the essential properties of the material of the guide wire its friction vis-a-vis for example plastics and living tissue is substantially reduced. This is of practical significance in using the guide wire for the insertion of for example catheters into the body.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

We claim:

1. A process for plasma polymerization at low pressure comprising the steps:
   (a) creating a plasma in a cascade arc generator to form a plasma torch which is directed into a low pressure zone;
   (b) injecting a monomeric gas into a central passage upstream of said plasma torch; and
   (c) directing the plasma torch resulting from step (b) onto a substrate to form a film thereon by plasma polymerization.

2. A process according to claim 1, wherein the vacuum of the low pressure zone is less than about 100 Torr.

3. A process according to claim 1, wherein said monomeric gas contains monomers selected from hydrocarbons and halogenated hydrocarbons, silanes and organosilanes, and any of the foregoing together with hydrogen.

4. A process according to claim 1, 2 or 3, wherein said substrate is a powder which is introduced into the plasma torch downstream of the monomeric gas injection site.

5. A process according to claim 1, 2 or 3, wherein said substrate is an elongated member which is passed in the direction of its length through the low pressure zone and into the torch to deposit film thereon by plasma polymerization.

6. A process according to claim 5, wherein the monomeric gas is injected at the downstream end of the low pressure zone.

7. A process according to claim 1, 2 or 3 wherein said plasma is generated at an energy input of 1 to 10 MJ/kg.

8. A cascade arc plasma torch apparatus for use in low temperature plasma polymerization coating, comprising means for vacuum generation and, in association therewith at least one plasma reactor including concentric electroconductive rings separated by insulator rings, said electroconductive rings and said insulator rings being arranged between electrode connectors and forming a central passage through said plasma reactor, a voltage supply source providing a voltage across said plasma reactor, and supply means for introducing an inert gas into said central passage, and further including conduit means for directing monomeric gas enabling plasma polymerization into a torch generated at the downstream end of said central passage.

9. A cascade arc plasma torch apparatus according to claim 8, further comprising powder inlet means enabling introduction of powder for plasma polymerization processing into generated plasma.

10. A cascade arc plasma torch apparatus according to claim 8 or 9, comprising two or more plasma reactors the torches of which converge to a focal point on the principal axis of said conduit means.

11. A cascade arc plasma torch apparatus according to claim 10, comprising powder inlet means in a number corresponding to the number of plasma reactors.

12. A cascade arc plasma torch apparatus for use in low temperature plasma polymerization coating, comprising means for vacuum generation and, in association therewith a plasma reactor including concentric electroconductive rings separated by insulator rings, said electroconductive rings and said insulator rings being arranged between electrode connectors and forming a central passage through said plasma reactor, a voltage supply source providing a voltage across said plasma reactor, and supply means for introducing an inert gas into said central passage, further including injector means positioned at a downstream end of the plasma reactor for injecting monomeric gas into said central passage at the downstream end thereof so as to permit plasma polymerization.

13. A cascade arc plasma torch apparatus according to claim 12, wherein said first inlet means is provided with inlet parts or nozzles distributed around the periphery of said central passage.

14. A cascade arc plasma torch apparatus according to claim 12 or 13, further comprising powder inlet means positioned downstream of said first inlet means enabling introduction of powder for plasma polymerization processing into generated plasma.

15. A cascade arc plasma torch apparatus according to claim 14, wherein said powder inlet means is provided with inlet parts or nozzles distributed around the periphery of said central passage.

16. A cascade arc plasma torch apparatus according to claim 12, wherein a plurality of arc plasma torches are provided in a substantially circular array around a principal axis.

17. A cascade arc plasma torch apparatus according to claim 16, wherein each of said plurality of plasma torches is arranged to converge to a focal point on said principal axis.

18. A cascade arc plasma torch apparatus according to claim 16, including means for passing a substrate through a flame zone defined by said plurality of arc plasma torches.

19. A cascade arc plasma torch apparatus according to claim 18, wherein said flame zone extends along said principal axis.

20. A cascade arc plasma torch apparatus according to claim 18, including means for passing a plurality of substrates through said flame zone.

21. A cascade arc plasma torch apparatus according to claim 18, including means for passing a substrate in the form of a powder through said flame zone.

* * * * *